(12) United States Patent
Patterson et al.

(10) Patent No.: US 9,535,427 B2
(45) Date of Patent: Jan. 3, 2017

(54) TEMPERATURE-CONTROLLED PRESSURE REGULATORS

(75) Inventors: Daryll Duane Patterson, N. Brooklyn Park, MN (US); Eric Jacob Burgett, Eden Prairie, MN (US)

(73) Assignee: Tescom Corporation, Elk River, MN (US)

( * ) Notice: Subject to any disclaimer, the term of this patent is extended or adjusted under 35 U.S.C. 154(b) by 2221 days.

(21) Appl. No.: 12/357,275

(22) Filed: Jan. 21, 2009

(65) Prior Publication Data
US 2010/0180960 A1    Jul. 22, 2010

(51) Int. Cl.
*G05D 16/06*    (2006.01)

(52) U.S. Cl.
CPC ...... *G05D 16/0655* (2013.01); *Y10T 137/6579* (2015.04)

(58) Field of Classification Search
CPC ................. G05D 16/0655; Y10T 137/6579
USPC ............. 137/340, 505.42, 334–341; 165/142
See application file for complete search history.

(56) References Cited

U.S. PATENT DOCUMENTS

| | | | |
|---|---|---|---|
| 3,804,595 A | 4/1974 | Scott | |
| 4,263,260 A | 4/1981 | Brautigam | |
| 4,590,770 A | 5/1986 | Howard | |
| 4,966,695 A | 10/1990 | Joshua | |
| 5,123,398 A * | 6/1992 | Klaus et al. | 123/543 |
| 5,373,725 A | 12/1994 | Sironi et al. | |
| 5,443,083 A * | 8/1995 | Gotthelf | 137/484.8 |
| 5,848,223 A | 12/1998 | Carlson | |
| 5,890,512 A | 4/1999 | Gotthelf et al. | |
| 6,345,611 B1 * | 2/2002 | Hartman et al. | 123/553 |
| 6,666,074 B2 | 12/2003 | Gerner et al. | |
| 6,816,669 B2 * | 11/2004 | Zimmer et al. | 392/397 |
| 7,021,329 B2 | 4/2006 | Hyde et al. | |
| 7,165,573 B2 | 1/2007 | Gotthelf | |
| 2006/0081290 A1 * | 4/2006 | Sachs | 137/340 |
| 2006/0243427 A1 | 11/2006 | Kitajima et al. | |

OTHER PUBLICATIONS

Advanced Pressure Technology, "Series VS 1000 Vaporizing Steam Heated Single Stage Pressure Regulator," Product Bulletin for Series VS 1010 Regulators, Sep. 2006 (2 pages).

(Continued)

*Primary Examiner* — Mary McManmon
*Assistant Examiner* — Ian Paquette
(74) *Attorney, Agent, or Firm* — Hanley, Flight & Zimmerman, LLC

(57) ABSTRACT

Temperature-controlled pressure regulators are described. An example temperature-controlled pressure regulator described herein includes a regulator body having a process fluid inlet fluidly coupled to a process fluid outlet via a first passageway and a heat transfer medium inlet to be fluidly coupled to a heat transfer medium outlet via a second passageway, where the heat transfer medium inlet is integrally formed with the regulator body. A heat chamber body is removably coupled to the regulator body to form a chamber between the heat transfer medium inlet and the heat transfer medium outlet. At least a portion of the first passageway is disposed within the chamber, and the chamber is to receive a heat transfer medium via the heat transfer medium inlet to provide heat to the process fluid as the process fluid flows through the chamber via the first passageway, which separates the process fluid from the heat transfer medium.

20 Claims, 4 Drawing Sheets

(56) References Cited

OTHER PUBLICATIONS

Aqua Environment Co, Inc., "Operation and Maintenance Model 873H -1500 & -5000 Regulators," Technical Bulletin for Model 873 -1500 & -5000 Regulators (2 pages).
Laboratory Equipment, Concoa 452 Series, "Vaporizing Regulators Heated by Steam or Electric," www.laboratoryequipment.com, archived on Jan. 12, 2007 (3 pages).
Controls Corporation of America (CONCOA), "452 Series Vaporizing Regulators," Installation and Operation Instruction, Manual for 452 Series Vaporizing Regulators, May 2005 (12 pages).
Purity Plus, "Concoa 452 Series, Single Stage, Stainless Steel Barstock Heated Regulator," Product Bulletin for 452 Series Regulators, www.purityplusgas.com (2 pages).
Controls Corporation of America (CONCOA), "308 Series Regulator," Product Bulletin for 308 Series Regulators, www.concoa.com, Aug. 2002 (2 pages).
Controls Corporation of America, "8000 Series Regulators," Products Bulletin for 8000 Series Regulator, www.concoa.com (1 page).
Go Regulator, "CV Series Cylinder Vaporizer," Product Bulletin for CV Series Electrically Heated Two-Stage Pressure Regulators (3 pages).
Go Regulator, "DHR Series," Product Bulletin for DHR Series Electrically Heated Dual-Pressure Regulators (3 pages).
Go Regulator, "DHR Series," Product Bulletin for DHR Series Steam Heated Dual-Pressure Regulators (3 pages).
Go Regulator, "HPR-2 Series," Product Bulletin for HPR-2 Series Electrically Heated Regulators (3 pages).
Go Regulator, "HPR-2 Series," Product Bulletin for HPR-2 Series Steam Heated Regulators (2 pages).
Go Regulator, "HPR-2XW Series," Product Bulletin for HPR-2XW Series Electrically Heated Pressure Regulators (3 pages).
Go Regulator, "MV-1 Series," Product Bulletin for MV-1 Series Miniature Vaporizing Pressure Regulator (3 pages).
Conoflow ITT Industries, "Conoflow High-Pressure Regulator—HP550," Product Bulletin for Conoflow High Pressure Regulator HP550, Pressure Reducing—Vaporizing Series Regulators, Jan. 31, 2003 (4 pages).
Conoflow ITT Industries, "Conoflow High-Pressure Regulator—HP555," Product Bulletin for Conoflow High-Pressure Regulator HP555 Electric Vaporizing Regulators, Jan. 31, 2003 (4 pages).
Pressure Tech 2000, "XHR/SHR 300 Series," Product Bulletin for XHR/SHR 300 Series Electric and Steam Heated Regulators (2 pages).
Pressure Tech 2000, "XHR-300 Series," Product Bulletin for XHR-300 Series, 'Low Flow' Electric and Steam Heated Regulators (2 pages).
Swagelok, "Steam-Heated Regulators," Product Bulletin for KSV Series Steam-Heated Regulators (2 pages).
Swagelok, Product Bulletin for KEV Series Pressure Regulators (2 pages).
Tescom Industrial Controls, "Vaporizing Regulators," Product Bulletin for 44/4800 Series Vaporizing Regulator, Emerson Process Management, May 2006 (4 pages).
Tescom, "Vaporizing Regulators," Product Bulletin for 44/4800 Series Vaporizing Regulator, Emerson Process Management (4 pages).
Parker Hannifin Corporation, "Vaporizing Regulators," Vaporizing Regulator Instruments/Analyzers Products Catalog 4512, Apr. 2005 (16 pages).
Druva, Products Bulletin for LRX 500 and GVW 250 Series Regulators (1 page).
Precise Equipment Company, Ltd., "160 CFH Heater," Product Bulletin for 160 CFH Heater, 2006 (2 pages).
Porter Instrument Company, "Porter Vaporizer," Product Bulletin for D8000 Series Vaporizer Module (1 page).
MSP Corporation, "Model 2800," Product Bulletin for Model 2800 Turbo-Vaporizer, 2004 (4 pages).
Brooks Instrument, "Brooks/MSP 2800 Turbo-Vaporizer System," Product Bulletin for Brooks/MSP 2800 Turbo-Vaporizer System, Emerson Process Management (2 pages).
Brooks Instrument, "Brooks/MSP 2800 Turbo-Vaporizer System," Product Bulletin for Brooks/MSP 2800 Turbo-Vaporizer System, Emerson Process Management, Jul. 2005 (8 pages).
Tescom, "Electrical Heating for Specialty Gas Regulators,"Product Bulletin for Electrical Heating for Specialty Gas Regulators, Emerson Process Management (2 pages).
Go Regulator, "CV Series Cylinder Vaporizer," Product Bulletin for CV Series Steam Heated Two-Stage Pressure Regulators (3 pages).
Go Regulator, "HPR-2XW Series," Product Bulletin for HPR-2XW Series Steam Heated Pressure Regulators (3 pages).
Pressure Tech 2000, "XHR-301 Series," Product Bulletin for XHR-301 Series, 'Low Flow' Electric and Steam Heated Regulators (2 pages).
A+ Corporation, LLC, "Genie Heated Regulator," Product Bulletin for Model GHR of Genie Heated Regulators, 2005 (2 pages).
International Searching Authority, "International Search Report," issued in connection with international application serial No. PCT/US2010/020658, mailed May 3, 2010, 3 pages.
International Searching Authority, "Written Opinion of the International Searching Authority," issued in connection with application serial No. PCT/US2010/020658, mailed May 3, 2010, 7 pages.
International Bureau, "International Preliminary Report on Patentability," issued in connection with international application serial No. PCT/US2010/020658, issued Jul. 26, 2011, 7 pages.
United States Patent and Trademark Office, "Non-Final Office Action," issued in connection with U.S. Appl. No. 12/357,178, mailed Aug. 31, 2011, 30 pages.
International Searching Authority, "International Search Report," issued in connection with international application serial No. PCT/US2009/068750, mailed Feb. 28, 2012, 5 pages.
International Searching Authority, "Written Opinion of the International Searching Authority," issued in connection with international application serial No. PCT/US2009/068750, mailed Feb. 28, 2012, 10 pages.
International Bureau, "International Preliminary Report on Patentability," issued in connection with international application serial No. PCT/US2009/068750, mailed Mar. 22, 2012, 10 pages.
Polednicek et al., "Flow Unit for Measuring Heats of Mixing at Subambient Conditions," Rev. of Scientific Instr., vol. 76, 074102, Jun. 27, 2005, retrieved from http://scitation.aip.org/getpdf/servlet/GetPDFServlet?filetype=pdf&id=RSINAK000076000007074102000001&idtype=cvips&doi=10.1063/1.1938647&prog=normal, 10 pages.
United States Patent and Trademark Office, "Final Office Action," issued in connection with U.S. Appl. No. 12/357,178, mailed Jan. 26, 2012, 22 pages.
United States Patent and Trademark Office, "Advisory Action," issued in connection with U.S. Appl. No. 12/357,178, mailed May 4, 2012, 8 pages.
United States Patent and Trademark Office, "Notice of Allowance," issued in connection with U.S. Appl. No. 12/357,178, mailed Jul. 12, 2012, 12pages.

* cited by examiner

TEMPERATURE-CONTROLLED PRESSURE REGULATORS

FIELD OF THE DISCLOSURE

The present disclose relates generally to pressure regulators and, more particularly, to temperature-controlled pressure regulators.

BACKGROUND

Many process control systems use pressure regulators to control the pressure of a process fluid. Pressure reducing regulators are commonly used to receive a relatively high pressure fluid and output a relatively lower regulated output fluid pressure. In this manner, despite the pressure drop across the regulator, a pressure reducing regulator can provide a relatively constant output fluid pressure for a wide range of output loads (i.e., flow requirements, capacity, etc.).

A temperature-controlled pressure regulator typically reduces the pressure of process fluid between an inlet and an outlet of the pressure regulator while controlling the temperature of the process fluid (e.g., maintaining the temperature of the process fluid at a predetermined temperature). Controlling the temperature of the process fluid prevents condensation and/or induces vaporization of the process fluid across the regulator as the pressure of the process fluid is reduced between an inlet and an outlet of the regulator.

In general, temperature-controlled regulators provide vapor pressure control and are often used with sampling systems in which analysis equipment may require the process fluid to be in a gaseous or vapor state while having a relatively low pressure. For example, in the petrochemical industry, samples of process fluid containing liquid hydrocarbons are often analyzed (e.g., via chromatographic analysis) for quality control. Such process fluid samples must often be in a gaseous state or vapor phase. Thus, a temperature-controlled pressure regulator may be used to preheat liquids, prevent condensation of gases, or vaporize liquids prior to analysis. For example, a temperature-controlled pressure regulator may be used to preheat liquids prevent condensation of gases, or vaporize liquids prior to analysis (e.g. chromatographic analysis).

Temperature-controlled pressure regulators typically employ steam or electric heating to control the temperature of a process fluid. The process fluid is heated within the regulator because the process fluid experiences a substantial decrease or drop in pressure through the regulator (e.g., across a valve seat). The decrease in pressure causes a significant loss of heat (e.g., a temperature drop) in the process fluid (e.g., a gas) in accordance with the Joule-Thomson effect. A temperature-controlled regulator applies heat at the point of the pressure drop to increase or maintain the temperature of the process fluid, thereby preventing condensation of the process fluid (e.g., a saturated gas) as the pressure of the process fluid decreases across the regulator. In other instances, for example, it may be desirable for a liquid to be vaporized. In this instance, the temperature-controlled regulator applies heat to vaporize the liquid as the liquid passes through the regulator to facilitate, for example, analysis of the liquid via a vapor sample.

Because of the different applications, a temperature-controlled regulator could be referred to as a heated regulator. For examples a heated regulator may be used to heat (e.g., via a heating medium) an inlet process fluid containing liquid to be analyzed (e.g., a liquid containing hydrocarbons). In another example, a temperature-controlled regulator may be used to vaporize (e.g., via a heat source) an inlet process fluid containing a vapor to be analyzed (e.g., a vapor containing hydrocarbons).

SUMMARY

Figure 1:
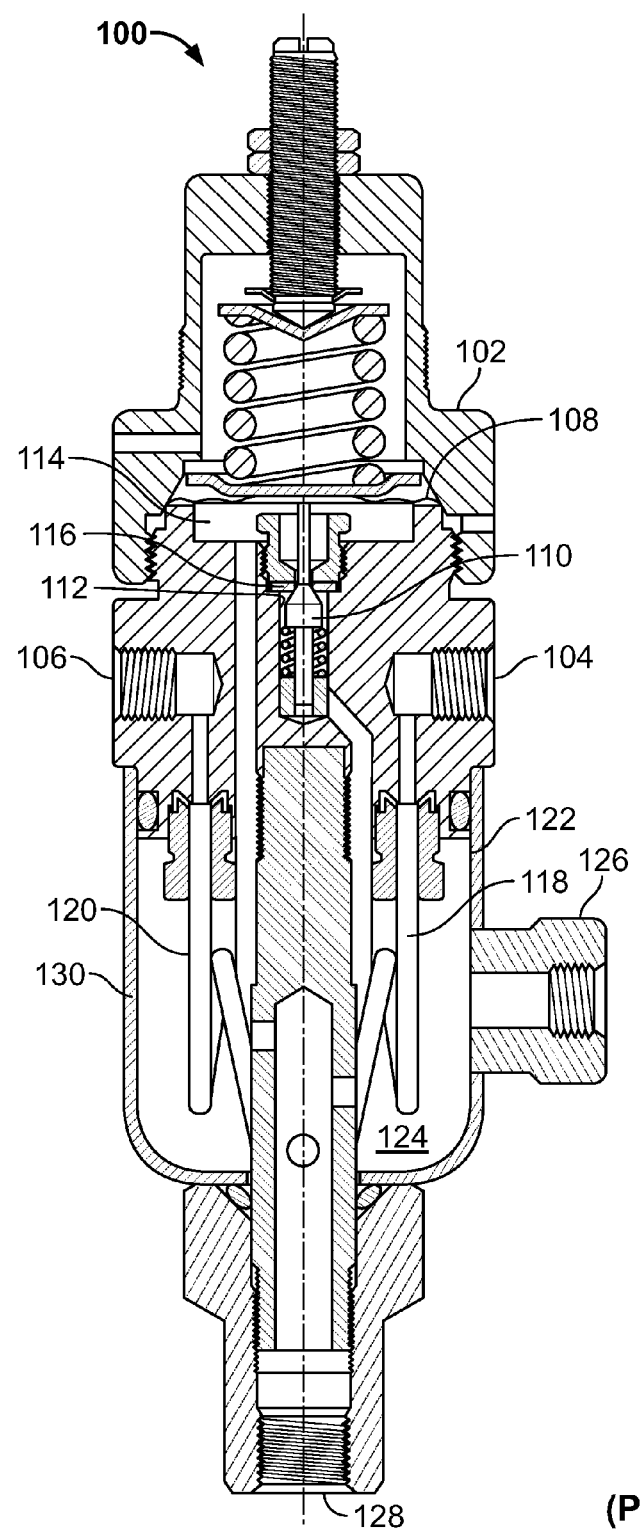
FIG. 1 is cross-sectional view of a known temperature-controlled pressure regulator.

In one example, an example temperature-controlled pressure regulator includes a regulator body having a process fluid inlet fluidly coupled to a process fluid outlet via a first passageway and a heat transfer medium inlet to be fluidly coupled to a heat transfer medium outlet via a second passageway, where the heat transfer medium inlet is integrally formed with the regulator body. A heat chamber body is removably coupled to the regulator body to form a chamber between the heat transfer medium inlet and the heat transfer medium outlet. At least a portion of the first passageway is disposed within the chamber. The chamber is to receive a heat transfer medium via the heat transfer medium inlet to provide heat to the process fluid as the process fluid flows through the chamber via the first passageway, which the first passageway separates the process fluid from the heat transfer medium.

In another example, a temperature-controlled pressure regulator includes a body having an upper portion removably coupled to a lower portion. The lower portion includes a process fluid flow path between an inlet port and an outlet port, and a steam inlet port to be fluidly coupled to a steam outlet port. A heat chamber body is coupled to the lower portion of the regulator body, where the heat chamber body includes an opening to define a heat chamber when coupled to the regulator body. The heat chamber is to receive steam via the steam inlet port. A first passageway at least partially defines the process fluid flow path between the inlet and the outlet and is at least partially disposed within the heat chamber, and where the first passageway separates the process fluid from the steam.

DETAILED DESCRIPTION

The example temperature-controlled pressure regulators described herein employ a heat transfer medium (e.g., steam) to control (e.g., increase) the outlet temperature of the process fluid (e.g., corrosive fluids, natural gas, etc.) as the pressure of the process fluid is reduced through the regulator. In particular, the example regulators described herein include a heat transfer medium inlet integrally formed with a body of the regulator. Integrally forming the heat transfer medium inlet with the regulator body enables the regulator to receive a heat transfer medium (e.g., steam) at a relatively greater or higher pressure (e.g., between about 250 psi and 1,000 psi) than a regulator having a heat transfer medium inlet or a steam port coupled (e.g., via welding) to a heat chamber body and/or the regulator body. For example, a heat transfer medium inlet that is coupled to a tube or heat chamber via, for example, welding can typically only withstand a heat transfer medium having a maximum pressure of about, for example, 250 psi due to, for example, the limited strength of the weld.

In this manner (e.g., integrally forming the heat transfer medium inlet with the regulator body), the example temperature-controlled pressure regulators may be provided with a heat transfer medium having a substantially higher or greater temperature (e.g., between about 300° F. and 1000° F.). Such a configuration enables the temperature-controlled pressure regulators to provide a process fluid having a greater outlet temperature (e.g., a process fluid having an outlet temperature between about 300° F. and 1000° F.). Furthermore, the example regulators described herein eliminate manufacturing operations required to couple (e.g., weld) the heat transfer medium inlet to a regulator body or a heat chamber body, thereby reducing manufacturing costs, inventory, maintenance, etc.

Additionally, the example temperature-controlled pressure regulators described herein provide a greater heat transfer contact area than some known temperature-controlled pressure regulators. For example, at least a partial passageway (e.g., a tubular passageway) is disposed within (e.g., snaked through) a heat chamber in a coil or U-shaped configuration to increase the heat transfer contact area between the heat transfer medium (e.g., steam) in the heat chamber and the process fluid flowing within the passageway. Disposing or routing the passageway through the heat chamber in this manner (e.g., a coil configuration) increases the heat transfer rate between the heat transfer medium and the process fluid flowing within the passageway to provide a process fluid having a higher or greater outlet temperature.

For example, the example regulators described herein can provide process fluid having outlet temperatures of about, for example, 500° F. In contrast, known temperature-controlled pressure regulators can typically provide process fluid having maximum outlet temperatures of approximately 350° F. Thus, the example regulators described herein can provide process fluid having remarkably higher outlet temperatures than some known temperature-controlled pressure regulators.

Before discussing the details of an example temperature-controlled pressure regulator described herein, a description of a known temperature-controlled pressure regulator 100 is provided in FIG. 1. The known temperature-controlled pressure regulator 100 is typically used to control an outlet temperature (e.g., a predetermined temperature) of a process fluid flowing through the regulator 100. The regulator 100 includes a body 102 having an inlet 104 and an outlet 106. A diaphragm 108 and a flow control member 110 (e.g., a valve plug) are disposed within the body 102 to define an inlet chamber 112 and a pressure chamber 114. The diaphragm 108 moves the flow control member 110 relative to a valve seat 116 to control the pressure of the process fluid at the outlet 106. A first passageway 118 fluidly couples the inlet 104 to the inlet chamber 112 and a second passageway 120 fluidly couples the outlet 106 to the pressure chamber 114. A tubular body or heat chamber body 122 (e.g., a cylindrically-shaped body) is coupled (e.g., threadably coupled) to the body 102 of the regulator 100 to form a heat chamber 124. The heat chamber 124 receives at least a portion of the first and second passageways 118 and 120. The heat chamber body 122 also includes a heat transfer medium inlet port 126 and an outlet port 128. A heat transfer medium such as, for example, steam flows through the heat chamber 124 between the inlet port 126 and the outlet port 128.

In operation, the heat chamber 124 may receive steam up to a maximum pressure of about, for example, 250 psi and having a maximum temperature of about, for example, 350° F. As the steam flows through the heat chamber 124, energy (e.g., thermal energy or heat) from the steam is transferred to the process fluid via portions of the first and second passageways 118 and 120 that are disposed within the heat chamber 124. As a result, in some instances, the increase in heat causes the process fluid to vaporize or, in other instances, prevents condensation of the process fluid, for example, if the process fluid is already in a gaseous or vapor state as it enters the regulator 100 via the inlet 104.

However, with the known regulator 100 of FIG. 1, the media (e.g., steam) may be limited in the amount of heat it can transfer to the process fluid. In particular, for example, the pressure of the steam at the inlet 126 may be limited to a maximum pressure of about, for example, 250 psi. Restricting or limiting the pressure of the steam at the inlet 126 also limits the maximum temperature of the steam to about, for example, 350° F., which, in some instances, may be insufficient to vaporize or prevent condensation of a process fluid.

The pressure of the heat transfer media (e.g., steam) at the inlet 126 may be limited because the inlet 126 is typically welded to the heat chamber body 122. Thus, a weld joint (not shown) that couples the steam inlet 126 to a wall 130 of the heat chamber body 122 may not be able to withstand steam at pressures of, for example, greater than 250 psi. As noted above, limiting the pressure of the steam at the inlet 126 also limits the maximum temperature of the steam, which results in a lower heat transfer rate between the steam and the process fluid.

Additionally, welding the inlet 126 to the wall 130 of the heat chamber body 122 may also restrict or limit the thickness of the wall 130 to, for example, 1/16 of an inch. A wall (e.g., the wall 130) having such a limited thickness may not be able to withstand steam pressures greater than, for example, about 250 psi. Thus, the known temperature-controlled pressure regulator 100 may not be able to withstand heat transfer media pressures that are greater than, for example, about 250 psi, thereby limiting the temperature of the heat transfer media through the heat chamber 124 and, thus, providing lower process fluid outlet temperatures. Furthermore, welding the steam inlet port to the heat chamber body increases manufacturing costs, inventory costs, etc.

In other known examples, a steam tube passes through a flow path of a regulator body (e.g., the regulator body 102). Thus, the process fluid directly contacts the steam tube as it flows through the regulator. However, such a configuration typically provides a lower heat transfer rate because the heat tube is in contact with the process media for a short duration as the process fluid flows through the regulator, thereby providing lower process fluid outlet temperatures.

In yet other known examples, a steam port is coupled to a regulator body proximate to the process fluid. The steam port receives steam, which provides heat to the regulator body. The regulator body, in turn, provides heat to the process fluid as it flows between an inlet and an outlet of the regulator body proximate the steam port. In this configuration, the steam generally heats the regulator body containing the process fluid flow path. However, such a configuration may result in poor heat transfer (e.g., a low heat transfer rate) and often requires relatively more energy to heat or maintain the process fluid at a desired temperature. In some instances, an insufficient heat transfer may cause the process fluid to condense.

Figure 2A:
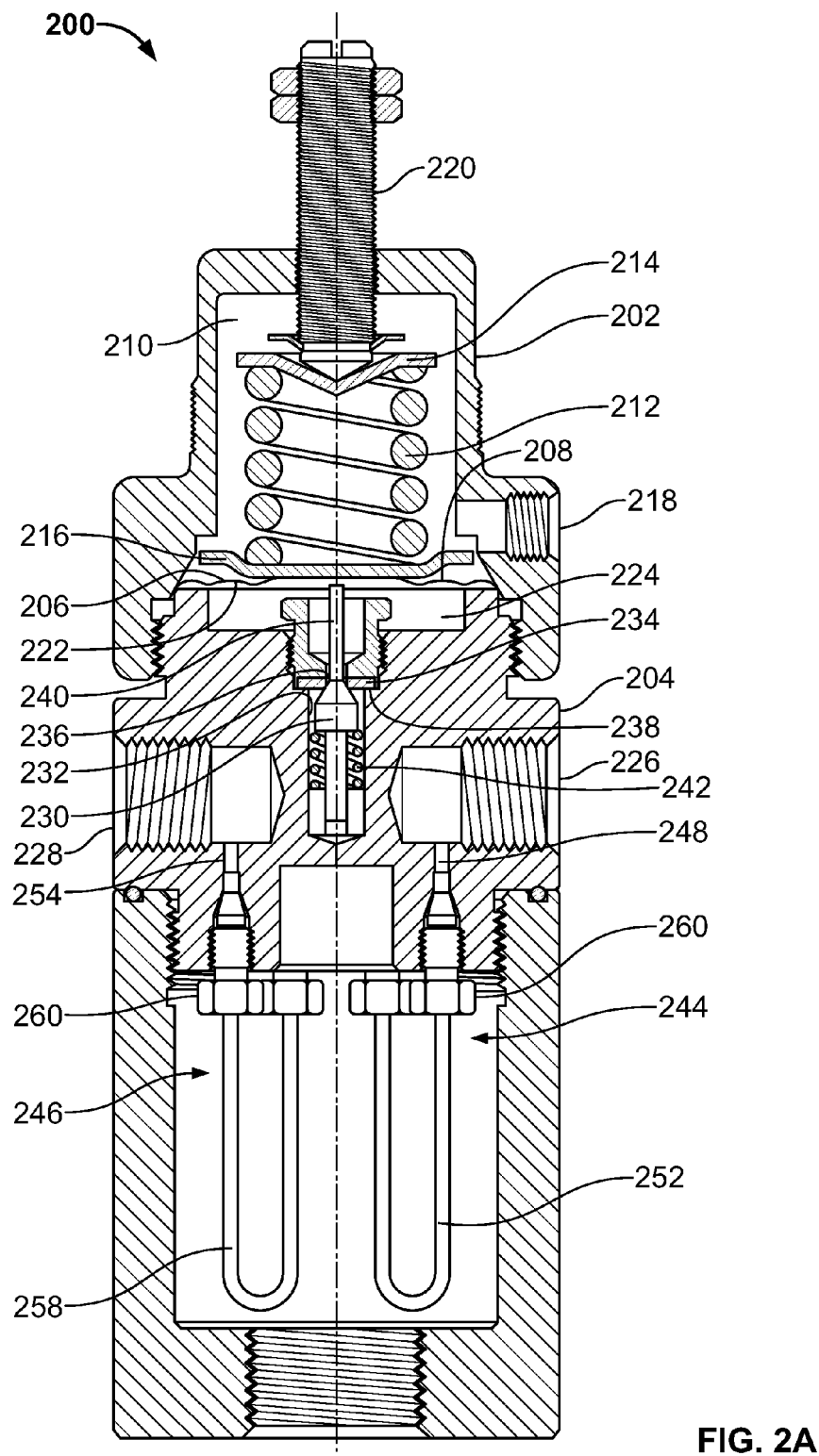
FIG. 2A is a sectional view of the example temperature-controlled pressure regulator described herein.
Figure 2B:
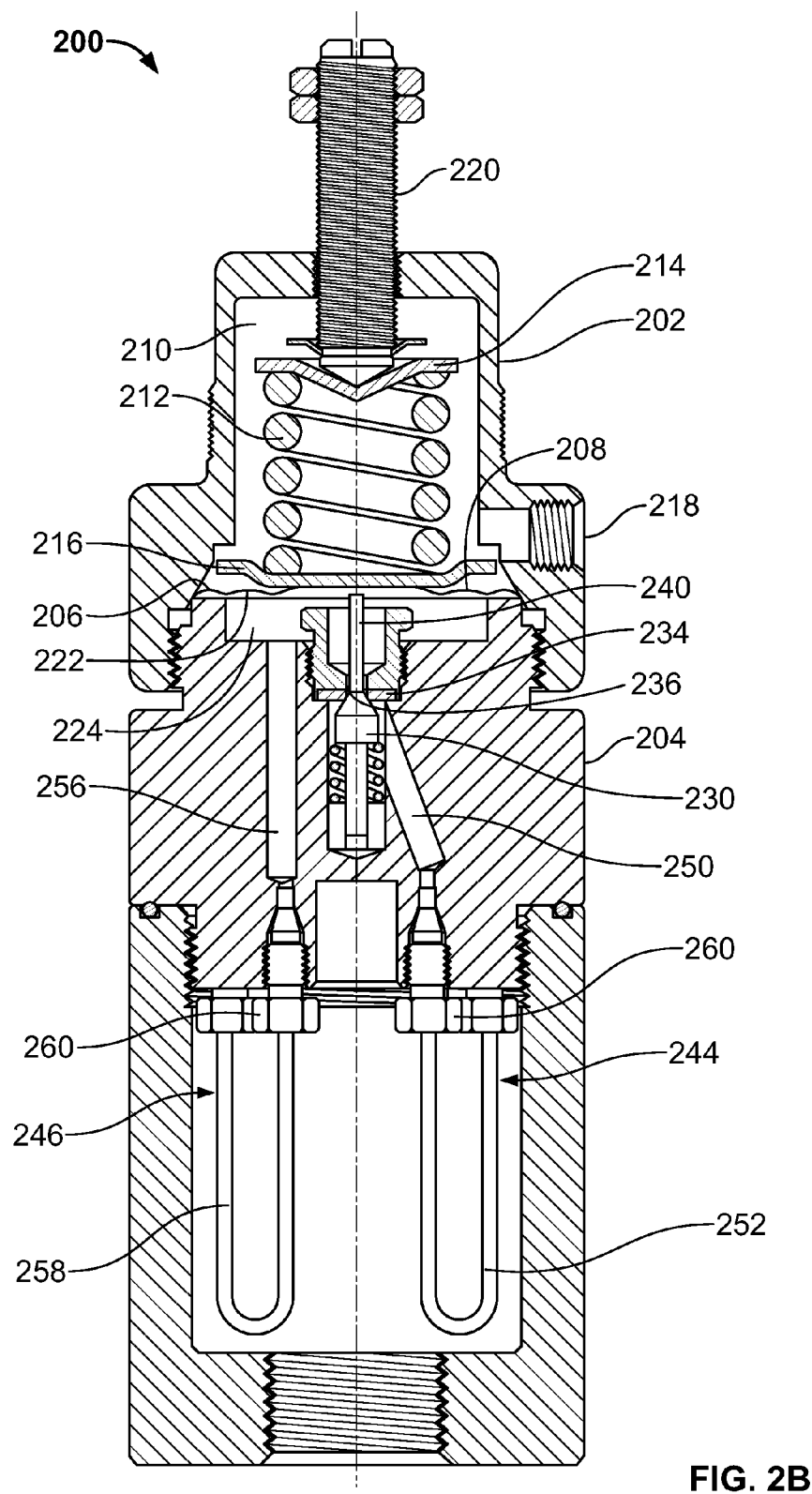
FIG. 2B is another sectional view of the example temperature-controlled pressure regulator of FIG. 2A.

FIGS. 2A and 2B are sectional views of an example temperature-controlled pressure regulator 200. The example temperature-controlled pressure regulators described herein reduce the pressure of the process fluid while controlling the temperature of the process fluid (e.g., corrosive fluids, natural gas, etc.).

The example regulator 200 includes an upper body 202 coupled (e.g., threadably coupled) to a lower body 204. A diaphragm 206 is captured between the upper body 202 and the lower body 204. The upper body 202 and a first side 208 of the diaphragm 206 define a first chamber 210. A biasing element 212 (e.g., a spring) is disposed within the first chamber 210 between an adjustable spring seat 214 and a diaphragm plate 216, which supports the diaphragm 206. In this example, the first chamber 210 is fluidly coupled to, for example, the atmosphere, via a vent 218. A spring adjuster 220 (e.g., a screw) engages the adjustable spring seat 214 to enable adjustment of the length of the biasing element 212 (e.g., to compress or decompress the biasing element 212) and, thus, adjustment of (e.g., to increase or decrease) the amount of a pre-set force or load that the biasing element 212 is to exert on the first side 208 of the diaphragm 206.

The lower body 204 and a second side 222 of the diaphragm 206 at least partially define a pressure chamber 224, an inlet 226, and an outlet 228. A valve plug 230 is disposed within a longitudinal bore or inlet chamber 232 in the lower body 204. A valve seat 234 is disposed between the inlet chamber 232 and the pressure chamber 224 and defines an orifice 236 in the fluid flow path between the inlet 226 and the outlet 228. In this example, the valve seat 234 engages a shoulder 238 formed via, for example, a counterbore. The valve plug 230 is operatively coupled to the diaphragm 206 via the diaphragm plate 216 and a valve stem 240. In operation, the diaphragm 206 moves the valve plug 230 toward and away from the valve seat 234 to prevent or allow fluid flow between the inlet 226 and the outlet 228. A second spring 242 is disposed within the inlet chamber 232 to bias the valve plug 230 toward the valve seat 234. In the illustrated example, the valve plug 230 can engage the valve seat 234 to provide a tight seal to prevent fluid flow between the inlet 226 and the outlet 228. The spring rate of the second spring 242 is typically substantially smaller relative to the spring rate of the biasing element 212.

As shown in FIGS. 2A and 2B, the inlet 226 is fluidly coupled to the inlet chamber 232 via a first passageway 244 and the outlet 228 is fluidly coupled to the pressure chamber 224 via a second passageway 246. In this example, the first passageway 244 includes integral pathways 248 and 250 that are integrally formed with the lower body 204, and a removably coupled tubular passageway 252 (e.g., tubing) that fluidly couples the integral pathways 248 and 250 between the inlet 226 and the inlet chamber 232. Similarly, the second passageway 246 includes integral pathways 254 and 256 that are integrally formed with the lower body 204, and a removably coupled tubular passageway 258 (e.g., tubing) to fluidly couple the integral pathways 254 and 256 between the pressure chamber 224 and the outlet 228. The tubular passageways 252 and 258 are coupled to the lower body 204 (e.g., to the respective integral pathways 248, 250, 254, and 256) via couplings 260 such as, for example, compression fittings. However, in other examples, the inlet 226 and the outlet 228 may be fluidly coupled via other suitable passageways and/or pathways. In this example, the tubular passageways 252 and 258 are tubing made of a corrosion resistant material such as, for example, stainless steel. However, in other examples, the tubular passageways 252 and/or 258 may be made of, nickel-copper, nickel-chromium, brass, or any other suitable material(s).

Figure 3:
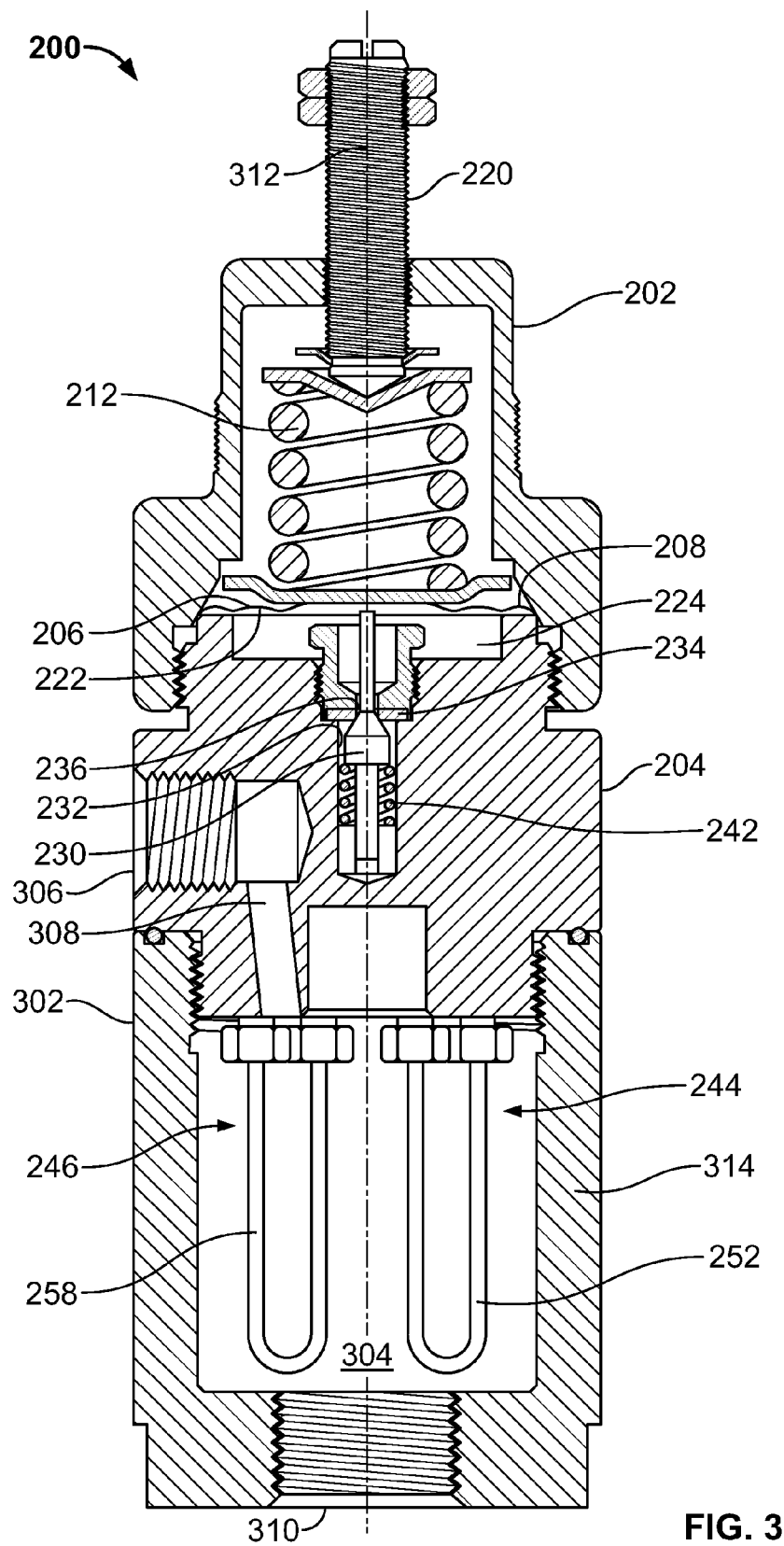
FIG. 3 is yet another sectional view of the example temperature-controlled pressure regulator of FIGS. 2A and 2B.

FIG. 3 is another sectional view of the example temperature-controlled reducing regulator 200 of FIGS. 2A and 2B. Referring to FIGS. 2A, 2B, and 3, a heat chamber body or tubular body 302 is coupled to the lower body 204 of the regulator 200. In this example, the heat chamber body 302 is a cylindrically-shaped body that threadably couples to the lower body 204. When coupled to the lower body 204, the heat chamber body 302 forms or defines a heat chamber 304. A heat transfer medium inlet 306 (e.g., a steam inlet port) is integrally formed with the lower body 204. A pathway 308 integrally formed with the lower body 204 fluidly couples the heat transfer medium inlet 306 and the heat chamber 304. The heat chamber 304 receives heat transfer medium (e.g., steam) via the heat transfer medium inlet 306 at a relatively high pressure (e.g., between about 250 psi and 1000 psi). In this example, the heat chamber body 302 is made of corrosion resistant material such as, for example, stainless steel. However, in other examples, the tubular passageways 252 and/or 258 may be made of, nickel-copper, nickel-chromium, brass, or any other suitable material(s).

In this example, at least a portion of the first passageway 244 (e.g., the tubular passageway 252) and a portion of the second passageway 246 (e.g., the tubular passageway 258) are disposed within the heat chamber 304. However, in other examples, at least a portion of the first passageway 244 or, alternatively, at least a portion of the second passageway 246 may be disposed within the heat chamber 304. Additionally, the tubular passageways 252 and 258 are disposed in the heat chamber 304 in a U-shaped or coil configuration to increase a heat transfer contact area between the heat transfer medium in the heat chamber 304 and the process fluid flowing within the tubular passageways 252 and 258. The tubular passageways 252 and 258 segregate, separate, or physically isolate the process fluid from the heat chamber 304 and, thus, from the heat transfer medium. The heat transfer medium flows through the heat chamber 304 between the heat transfer medium inlet 306 and a heat transfer medium outlet 310. In this example, the heat transfer medium outlet 310 is integrally formed with the heat chamber body 302.

In operation, the example temperature-controlled pressure regulator 200 fluidly couples to an upstream pressure source via the process fluid inlet 226 and fluidly couples to a downstream device or system via the process fluid outlet 228. For example, the inlet 226 couples the regulator 200 to, for example, a process control system that provides process fluid (e.g., containing hydrocarbons) at a relatively high pressure (e.g., 4,500 psi) to the regulator 200. The outlet 228 fluidly couples the regulator 200 to, for example, a downstream system such as, for example, a sampling system that demands process fluid at a certain (e.g., a lower) pressure (e.g., 0-500 psi). The sampling system may include an analyzer (e.g., a gas analyzer) that may require the process fluid to be at a relatively low pressure (e.g., 0-500 psi) and the process fluid (e.g., the sample) to be at a temperature (e.g., of about 500° F.) that causes the process fluid to be in a vapor state to enable or facilitate analysis of the process fluid (e.g., for quality control).

The temperature-controlled pressure regulator 200 typically regulates the pressure of the process fluid at the inlet 226 to provide or develop a certain or desired pressure at the outlet 228. The desired pressure set-point may be configured by adjusting the force exerted by the biasing element 212 on the first side 208 of the diaphragm 206 via the spring adjuster 220. To achieve a desired outlet pressure, the spring adjustor 220 is rotated or turned about an axis 312 (e.g., a clockwise or counterclockwise direction in the orientation of FIG. 3) to adjust the force exerted by the biasing element 212 on the first side 208 of the diaphragm 206. In turn, the force exerted by the biasing element 212 on the diaphragm 206 positions the valve plug 230 relative to the valve seat 234 (e.g., moves the valve plug 230 away from the valve seat 234 in the orientation of FIGS. 2A, 2B and 3) to allow process fluid flow between the inlet 226 and the outlet 228. Thus, the outlet or desired pressure is dependent upon the amount of pre-set force exerted by the biasing element 212 to position the diaphragm 206 and, thus, the valve plug 230 relative to the valve seat 234.

The pressure chamber 224 senses the pressure of the process fluid at the outlet 228 via the second passageway 246. When the pressure of the process fluid in the pressure chamber 224 increases to exert a force on the second side 222 of the diaphragm 206 that exceeds the pre-set force exerted by the biasing element 212 on the first side 208 of the diaphragm 206, the diaphragm 206 moves toward the first chamber 210 (e.g., an upward direction in the orientation of FIGS. 2A, 2B and 3) against the force exerted by the biasing element 212. When the diaphragm 206 moves toward the first chamber 210, the diaphragm 206 causes the valve plug 230 to move toward the valve seat 234 to restrict fluid flow through the orifice 236. The second spring 242 biases the valve plug 230 toward the valve seat 234 to sealingly engage the valve seat 234 (e.g., in a closed position) to substantially prevent fluid flow through the orifice 236 (i.e., between the inlet chamber 232 and the pressure chamber 224). Preventing or substantially restricting the fluid flow between the inlet 226 and the outlet 228 causes the pressure of the process fluid at the outlet 228 to decrease.

Conversely, the decreasing fluid pressure at the outlet 228 is registered in the pressure chamber 224 via the second passageway 246. When the pressure of the process fluid in the pressure chamber 224 decreases below the pre-set force exerted by the biasing element 212 on the first side 208 of the diaphragm 206, the biasing element 212 causes the diaphragm 206 to move in a direction (e.g., a downward direction in the orientation of FIGS. 2A, 2B and 3) toward the pressure chamber 224. When the diaphragm 206 moves toward the pressure chamber 224, the valve plug 230 moves away from the valve seat 234 to allow fluid to flow through the orifice 236 (e.g., an open position), thereby causing the pressure at the outlet 228 to increase. When the outlet pressure is substantially equal to the pre-set force exerted by the biasing element 212, the diaphragm 206 causes the valve plug 230 to assume a position that maintains the desired outlet pressure and provides the required fluid flow.

The pressure of the process fluid decreases significantly as the process fluid flows across the orifice 236. As a result, the decrease in pressure causes a significant temperature drop in the process fluid (e.g., due to the Joule-Thomson effect). To minimize the Joule-Thomson effect, the process fluid is heated as it flows between the inlet 226 and the outlet 228.

As the process fluid flows between the inlet 226 and the inlet chamber 232 via the first passageway 244, the heat transfer medium (e.g., steam) flows through the heat chamber 304 via the heat transfer medium inlet 306 and the heat transfer medium outlet 310 to provide heat to the heating chamber 304. The heat transfer medium within the heat chamber 304 transfers heat to the process fluid flowing within the tubular passageway 252. In this manner, for example, the process fluid may be heated as it flows through the first passageway 244 prior to flowing across the orifice 236. The process fluid flows between the pressure chamber 224 and the outlet 228 via the second passageway 246.

As noted above, in this example, the heat chamber 304 receives at least a portion of the second passageway 246 (e.g., the tubular passageway 258). The heat provided by the steam in the heat chamber 304 is transferred through the tubular passageway 258 to heat the process fluid flowing within the tubular passageway 258 between the pressure chamber 224 and the outlet 228. Thus, the process fluid may be heated again as it flows through the second passageway 246. In this manner, a process fluid that includes, for example, saturated gases may be maintained in the vapor state.

Thus, the example temperature-controlled pressure regulator 200 applies heat to the process fluid flowing through the first and second passageways 244 and 246 (e.g., at the point of the pressure drop) to increase or maintain the temperature of the process fluid at a desired temperature (e.g., of about 500° F.). Controlling the outlet temperature to a desired or predetermined temperature prevents condensation or induces vaporization of the process fluid as the pressure of the process fluid decreases across the regulator 200.

Additionally, in this example, an outer diameter of the tubular passageways 252 and 258 is sized (e.g., to have a relatively small outside diameter) such that a substantial amount of process fluid flowing through the tubular passageways 252 and 258 flows adjacent an inner surface (e.g., an inside diameter) of the tubular passageways 252 and 258. In this manner, the heat transfer rate improves when the process fluid flows adjacent the inner surface (i.e., substantially engages or contacts the inner surface) of the tubular passageways 252 and 258.

In this example, the heat transfer medium is steam. However, in other examples, the heat transfer medium may be any suitable heat transfer medium to provide heat to the process fluid flowing through the regulator 200. Because the heat transfer medium inlet 306 is integrally formed with the lower body 204, the steam may flow through the heat transfer medium inlet 306 at a relatively greater or higher pressure (e.g., a pressure of about 650 psi). For example, the steam flows through the heat transfer medium inlet 306 having relatively higher pressures (e.g., between about 250 psi and 1000 psi) than, for example, the pressure of the steam (e.g., at pressures up to about 250 psi) flowing through the inlet port 126 of the example regulator 100 described in FIG. 1. In this manner, the regulator 200 may receive steam or other heat transfer medium having remarkably higher or substantially greater temperatures such as, for example, a medium having a temperature between about 350° F. and 1000° F. As a result, the regulator 200 may provide process fluid having remarkably higher temperatures (e.g., between about 500° F. and 1000° F.).

Additionally or alternatively, by eliminating a coupling or weld joint between the heat transfer medium inlet 306 and the heat chamber body 302, the heat chamber body 302 may include a wall 314 having an increased thickness (e.g., about a ¼ of an inch) to provide more structural support to withstand a heat transfer medium having higher pressures such as, for example, steam having a pressure between about 250 psi and 1000 psi. The heat chamber body 302 may be made of stainless steel or any other suitable material(s).

Additionally, unlike some known pressure regulators, the pressure regulator 200 provides an increased heat transfer contact area and, thus, an increased heat transfer rate or a lower thermal resistance between the steam and the tubular passageways 252 and 258. As noted above, for example, the tubular passageways 252 and/or 258 may pass through (e.g., snake through) the heat chamber 304 in a U-shaped configuration, a W-shaped configuration, a coil configuration, or any other shaped configuration. Passing the tubular passageway 252 through the heat chamber 304 in this manner improves or increases the heat transfer contact area between the steam and the process fluid flowing through the tubular passageways 252 and 258. Increasing the heat transfer contact area provides a greater or increased heat transfer rate between the steam and the tubular passageways 252 and 258 and, thus, provides greater heat transfer and/or increased efficiency when heating the process fluid (e.g., more rapidly heats the process fluid and/or heats the process fluid to a higher desired temperature).

Although certain apparatus, methods, and articles of manufacture have been described herein, the scope of coverage of this patent is not limited thereto. To the contrary, this patent covers all embodiments fairly falling within the scope of the appended claims either literally or under the doctrine of equivalents.

What is claimed is:

1. A temperature-controlled pressure regulator, comprising:
    a regulator body having a process fluid inlet fluidly coupled to a process fluid outlet via a first passageway and a heat transfer medium inlet to be fluidly coupled to a heat transfer medium outlet via a second passageway, the heat transfer medium inlet being integrally formed with the regulator body; and
    a heat chamber body removably coupled to the regulator body to form a chamber between the heat transfer medium inlet and the heat transfer medium outlet, at least a portion of the first passageway disposed within the chamber, the chamber to receive a heat transfer medium via the heat transfer medium inlet to provide heat to the process fluid as the process fluid flows through the chamber via the first passageway, the first passageway to separate the process fluid from the heat transfer medium, the heat transfer medium outlet being integrally formed in the heat chamber body.

2. A temperature-controlled pressure regulator of claim 1, wherein at least the portion of the first passageway is disposed in the chamber in a coil configuration to increase a heat transfer contact area between the heat transfer medium and process fluid flowing within the first passageway.

3. A temperature-controlled pressure regulator of claim 1, wherein the first passageway comprises tubing.

4. A temperature-controlled pressure regulator of claim 1, wherein the heat chamber body comprises metal.

5. A temperature-controlled pressure regulator of claim 1, wherein the second passageway is integrally formed in the regulator body.

6. A temperature-controlled pressure regulator of claim 1, wherein the heat transfer medium comprises steam.

7. A temperature-controlled pressure regulator of claim 6, wherein the heat transfer medium inlet is to receive steam having a pressure between about 250 psi and 1000 psi.

8. A temperature-controlled pressure regulator of claim 6, wherein the heat chamber body is configured to receive steam having a temperature of between about 500° F. and 1000° F.

9. A pressure regulator, comprising:
    a body having an upper portion removably coupled to a lower portion, wherein the lower portion includes a process fluid flow path between an inlet port and an outlet port, the body having a steam inlet port integrally formed with the body that is to be fluidly coupled to a steam outlet port;
    a heat chamber body coupled to the lower portion of the body, the heat chamber body having an opening to define a heat chamber when coupled to the body the steam outlet port being integrally formed with the heat chamber body, the steam outlet port having an axis substantially parallel relative to a longitudinal axis of the body, the heat chamber to receive steam via the steam inlet port; and
    a first passageway to at least partially define the process fluid flow path between the inlet and the outlet, the first passageway at least partially disposed within the heat chamber, the first passageway to separate the process fluid from the steam.

10. A pressure regulator of claim 9, wherein at least the portion of the first passageway passes through the heat chamber in a U-shaped configuration to increase a heat transfer contact area between the steam in the chamber and the process fluid flowing within the first passageway to increase the heat transfer rate between the steam in the heat chamber and the first passageway.

11. A pressure regulator of claim 9, wherein the steam inlet port is configured to receive pressurized steam between about 250 psi and 1000 psi.

12. A pressure regulator of claim 9, wherein the heat chamber is configured to receive steam having a temperature between about 350° F. and 1,000° F.

13. A pressure regulator of claim 9, wherein the passageway comprises metal tubing.

14. A pressure regulator of claim 9, further comprising a second passageway integrally formed in the body to fluidly couple the steam inlet port and the heat chamber.

15. A pressure regulator of claim 9, wherein the heat chamber body comprises a wall thickness of about 0.25 inches.

16. A pressure regulator comprising:
    a heat chamber body, the heat chamber body having a heat transfer medium outlet port integrally formed with the heat chamber body; and
    a regulator body removably coupled to the heat chamber body, the regulator body defining a fluid inlet port and a fluid outlet port, the fluid inlet port being fluidly coupled to the fluid outlet port via a first passageway at least partially disposed in a heat chamber defined by the heat chamber body when the heat chamber body is coupled to the regulator body, the regulator body having a heat transfer medium inlet port integrally formed with the regulator body and fluidly coupled to the heat chamber via a second passageway integrally formed in the regulator body, the heat transfer medium inlet port, the fluid inlet port and the fluid outlet port being spaced apart relative to a longitudinal axis of the regulator body.

17. The regulator of claim 16, wherein each of the heat transfer medium inlet port, the fluid inlet port and the fluid outlet port comprises an axis that intersects the longitudinal axis of the regulator body.

18. The regulator of claim 16, wherein each axes of the heat transfer medium inlet port, the fluid inlet port and the fluid outlet port are parallel relative to each other.

19. The regulator of claim 16, wherein the regulator body defines at least a portion of the first passageway between the fluid inlet and the fluid outlet.

20. The regulator of claim 19, wherein the at least the portion of the first passageway is non-perpendicular relative to a longitudinal axis of the regulator body.

* * * * *